United States Patent [19]

Elliott

[11] Patent Number: 5,006,695

[45] Date of Patent: Apr. 9, 1991

[54] PROCESS CONTROLLER INCLUDING POWER LEVEL CONTROL AND METHOD OF OPERATION

[76] Inventor: Robert C. Elliott, 499 Hillbrook Dr., St. Louis, Mo. 63011

[21] Appl. No.: 404,211

[22] Filed: Sep. 7, 1989

[51] Int. Cl.⁵ ............................................. H05B 1/02
[52] U.S. Cl. ................................. 219/494; 219/501; 219/508; 219/497; 323/236
[58] Field of Search ............... 219/497, 494, 501, 505, 219/506, 508; 323/319, 238, 235, 236; 307/117

[56] References Cited

U.S. PATENT DOCUMENTS

| | | | |
|---|---|---|---|
| 3,050,611 | 8/1962 | Kamide | 219/20 |
| 3,541,429 | 11/1970 | Martin | 323/16 |
| 3,878,358 | 4/1975 | Barton et al. | 219/216 |
| 4,256,951 | 3/1981 | Payne et al. | 219/492 |
| 4,323,763 | 4/1982 | Goldsmith | 219/497 |
| 4,338,769 | 7/1982 | Jones | 53/509 |
| 4,495,405 | 1/1985 | Foster | 21/510 |
| 4,496,829 | 1/1985 | Black et al. | 219/497 |
| 4,506,144 | 3/1985 | Hesford et al. | 219/497 |
| 4,594,501 | 6/1986 | Culley et al. | 219/492 |
| 4,614,860 | 9/1986 | Kutivois | 219/589 |
| 4,730,101 | 3/1988 | Mahon et al. | 219/508 |
| 4,745,262 | 5/1988 | Larsen | 219/492 |
| 4,777,350 | 10/1988 | Crockett et al. | 219/497 |
| 4,894,520 | 1/1990 | Moran | 219/501 |

Primary Examiner—M. H. Paschall
Attorney, Agent, or Firm—Senniger, Powers, Leavitt & Roedel

[57] ABSTRACT

An apparatus for controlling a heating element for heating a substance in accordance with a maximum power which is to be applied to the heating element and in accordance with a selected temperature to which the substance is to be heated is used in combination with a temperature sensing probe for sensing the temperature of the substance heated by the heating element. The apparatus includes first circuitry for generating a first control signal which is a function of the difference between the selected temperature and the sensed temperature and second circuitry for generating a second control signal which is a function of the maximum power. The apparatus also includes a relay for providing power to the heating element and circuitry responsive to the first and second control signals for selectively applying power provided by the relay to the heating element whereby the amount of power applied to the heating element is reduced as the substance approaches the selected temperature thereby avoiding overheating the substance to a temperature significantly above the selected temperature.

21 Claims, 5 Drawing Sheets

PROCESS CONTROLLER INCLUDING POWER LEVEL CONTROL AND METHOD OF OPERATION

BACKGROUND OF THE INVENTION

The present invention relates to control systems used for heating substances and in particular to control systems for temperature process controllers for controlling the rate at which power is delivered to heating elements for heating substances, and their method of operation.

In modern laboratory analysis, accurate control of reaction pathways or processes requires that measurements be made at a controlled temperature. Process controllers, which are commercially available, are used to control the heating of a heating element, such as a heating mantle, which heats a substance in a flask on the mantle. A typical process controller includes a control panel for entering a set point temperature which represents the temperature to which the substance is to be heated. A temperature sensing probe is inserted into the substance and connected to the process controller for providing a sensed temperature to the process controller. The process controller compares the set point temperature to the sensed temperature. When the set point temperature is greater than the sensed temperature, the process controller provides an output signal that either (1) directly powers the heating mantle, or (2) powers an intermediate device that powers the heating mantle. In one configuration of the above, the presence of the output signal closes the contacts of the solid state relay to provide power, such 120 VAC, to operate the heating element. As the sensed temperature begins to approach the set point temperature, the controller stops providing the signal on a continuous basis to the relay and the output signal is provided on a proportional basis to the relay. As the difference between the sensed temperature and the set point temperature continues to narrow, the ratio of the on time/off time of the output signal decreases until a ratio is established that maintains the sensed temperature at the set point temperature.

Commerically available process controllers are acceptable in situations when the heater power at 120 VAC is appropriately matched to the mass being heated. However, in a small scale research environment, the heating power of the common heating element may be many times greater than that required for the mass being heated. When a process controller is used in this situation (i.e., high heater efficiency, low mass) it results in the process controller significantly exceeding the set point temperature on initial warm-up and sporadic temperature control thereafter. Thus, controlling this overshoot of the set point temperature is critically important. In the past, power supplied to the heating mantle has been reduced by placing a variable resistor such as a variac between the power source and the mantle. However, this approach has proved to be inaccurate and difficult to control.

SUMMARY OF THE INVENTION

Among the objects of the present invention is the provision of a power control apparatus which is capable of reducing the amount of power supplied to a heating device; the provision of such a power control apparatus which matches the power rate applied to a heating device to the mass of a substance to be heated; the provision of such a power control apparatus which controls a heating device to heat a substance to a desired temperature; and the provision of such a power control apparatus which reduces the power supplied to a heating device when the temperature of a substance reaches a desired temperature to which the substance is to be heated.

Generally, an apparatus for controlling means for heating a substance in accordance with a selected maximum power which is to be applied to the means for heating and in accordance with a selected temperature to which the substance is to be heated, is used in combination with means for sensing a temperature of the substance. The apparatus includes first means for generating a first control signal which is a function of the difference between the selected temperature and the sensed temperature, second means for generating a second control signal which is a function of the selected maximum power, means for providing power for the means for heating, and means responsive to the first and second control signals for selectively applying power provided by the means for providing to the means for heating whereby the amount of power applied to the means for heating is reduced as the substance approaches the selected temperature thereby avoiding overheating the substance to a temperature significantly above the selected temperature.

In another form, an apparatus for controlling heat applied to a substance includes means for sensing a temperature of the substance, means for heating the substance, first means for selecting a temperature to which the substance is to be heated, second means for selecting a percentage of the maximum power to be applied to the means for heating, and means for supplying power to the means for heating. The apparatus also includes means for controlling the rate at which power is to be applied by the means for heating to the substance in response to the selected temperature and the selected maximum power and means for comparing the sensed temperature of the substance and the selected temperature and reducing the duty cycle at which power is applied to the means for heating in the event that the sensed temperature is equal to or greater than the selected temperature.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
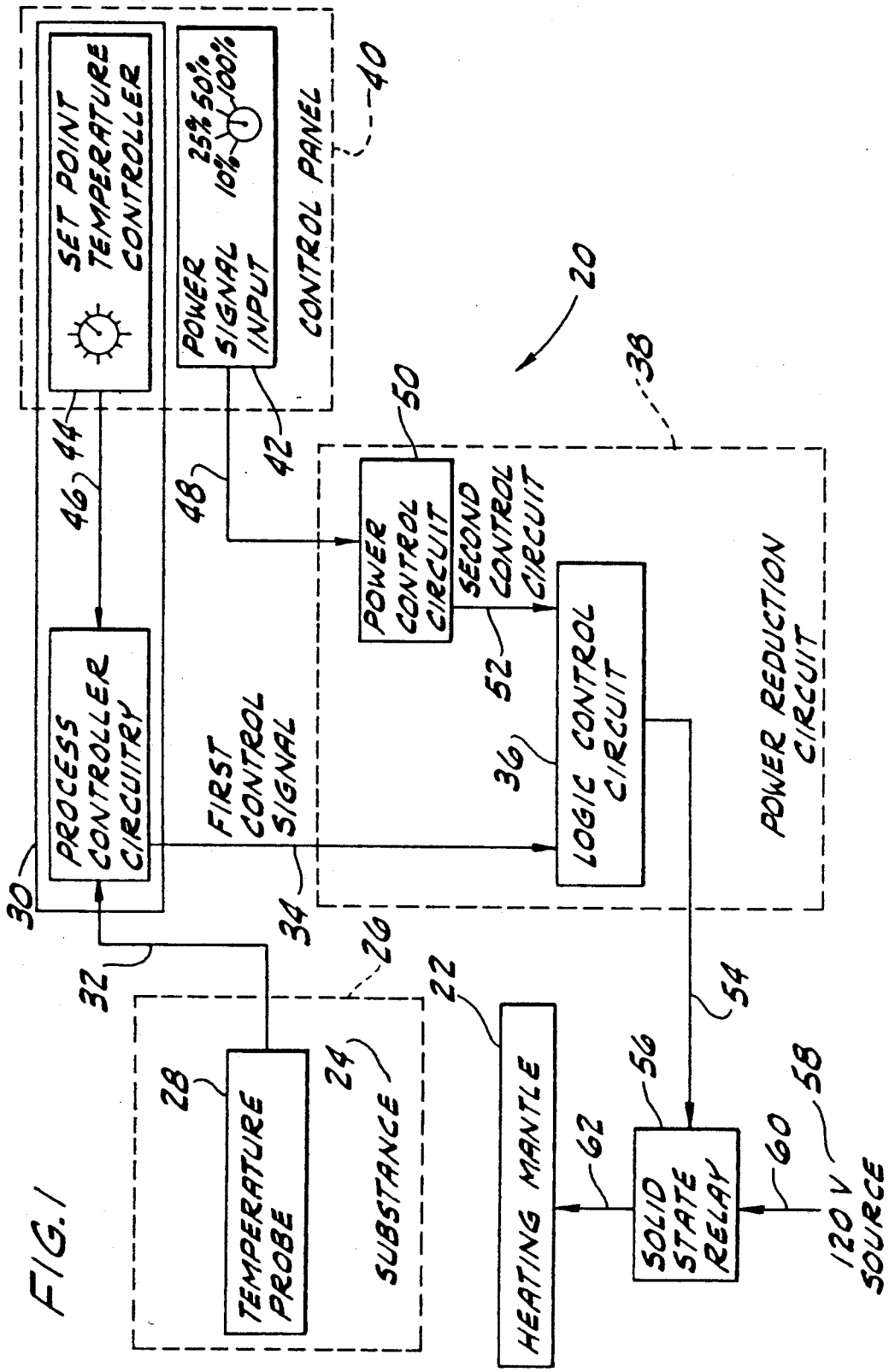
FIG. 1 is a block diagram of an power control apparatus according to the invention for controlling the amount of power supplied to a heating device in accordance with a selected temperature and a selected power level.

Referring now to FIG. 1, a block diagram of an apparatus 20 according to the invention for controlling the amount of power supplied to a heating device, such as a heating mantle 22 for heating a substance 24, such as a liquid in a flask 26, is shown. The apparatus 20 includes a temperature probe 28 in contact with and sensing the temperature of the substance 24 to be heated. The temperature probe 28 is connected to a process controller 30 via line 32. The process controller 30 is an off-the-shelf item such as a CAL 9000 manufactured by CAL Inc. and has an output connected via a line 34 to a logic control circuit 36 included in a power reduction circuit 38. A control panel 40 has a dial 44 for selecting a set point temperature to which the substance 24 is to heated. The process controller 30 generates a first control signal over line 34 which is a function of the difference between the selected set point temperature and the sensed temperature.

Power reduction circuit 38 consists of a power signal input 42 for operator selection and control of the percentage of power input to heating mantle 22. The switch 42 has an output which is provided over a line 48 to a power control circuit 50 included in the power reduction circuit 38. The power control circuit 50 has an output connected via a line 52 to the logic control circuit 36. The output of the power control circuit 50 provided via line 52 has a duty cycle which is a function of the maximum power selected by the switch 42.

The logic control circuit 36 generates an output over line 54 connected to a solid state relay 56. A power supply 58, such as a 120 volt power source, is connected to the solid state relay 56 via a line 60. The relay 56 has an output which is connected via a line 62 to the mantle 22.

Figure 2:
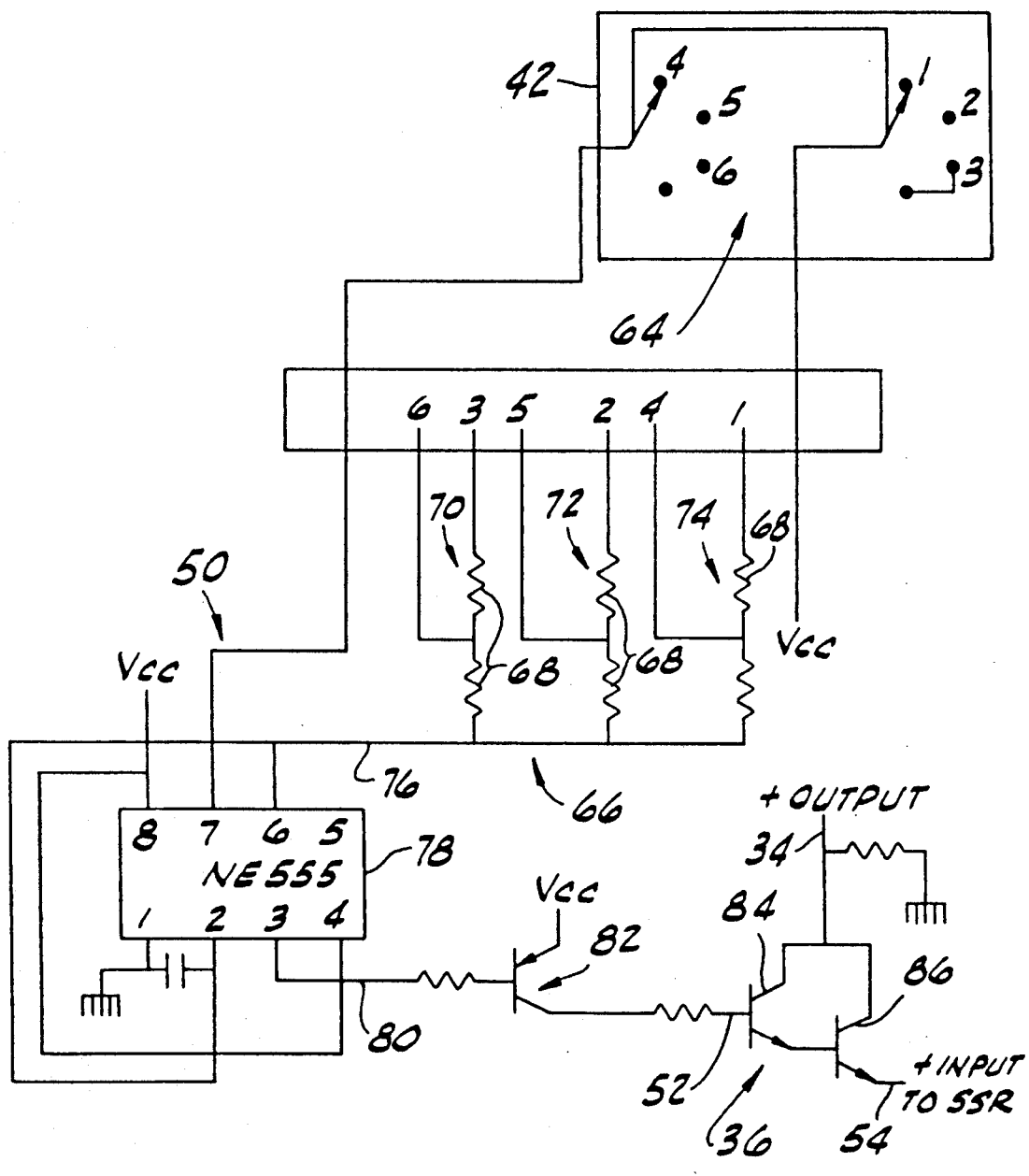
FIG. 2 is a schematic diagram which illustrates one preferred embodiment of circuitry according to the invention of the Power Reduction Circuit illustrated in FIG. 1.

FIG. 2 shows a schematic diagram of the switch 42, power control circuit 50, and the logic control circuit 36. Switch 42 includes a duplex five-position rotary switch 64 connected to a resistive network 66. The network 66 includes resistors 68 formed into three voltage dividers 70, 72, and 74. The voltage dividers 70, 72, and 74 are connected via a line 76 to a timer circuit 78, such as a 555 timer chip. An output of the circuit 78 is connected via a line 80 to a transistor 82 which inverts the output of the circuit 78. The output of the transistor 82 is coupled over line 52 to the logic control circuit 36. The logic control circuit 36 includes a pair of transistors 84 and 86 which form a Darlington amplifier. The output of the process controller 30, provided over line 34, and the inverted output of the timer chip 78, provided over line 52 are presented to the collectors of transistors 84 and 86 and the base of transistor 84, respectively, so that transistors 84 and 86 form an AND gate. The output of transistor 86 is provided over line 54 to the solid state relay 56.

Figure 3:
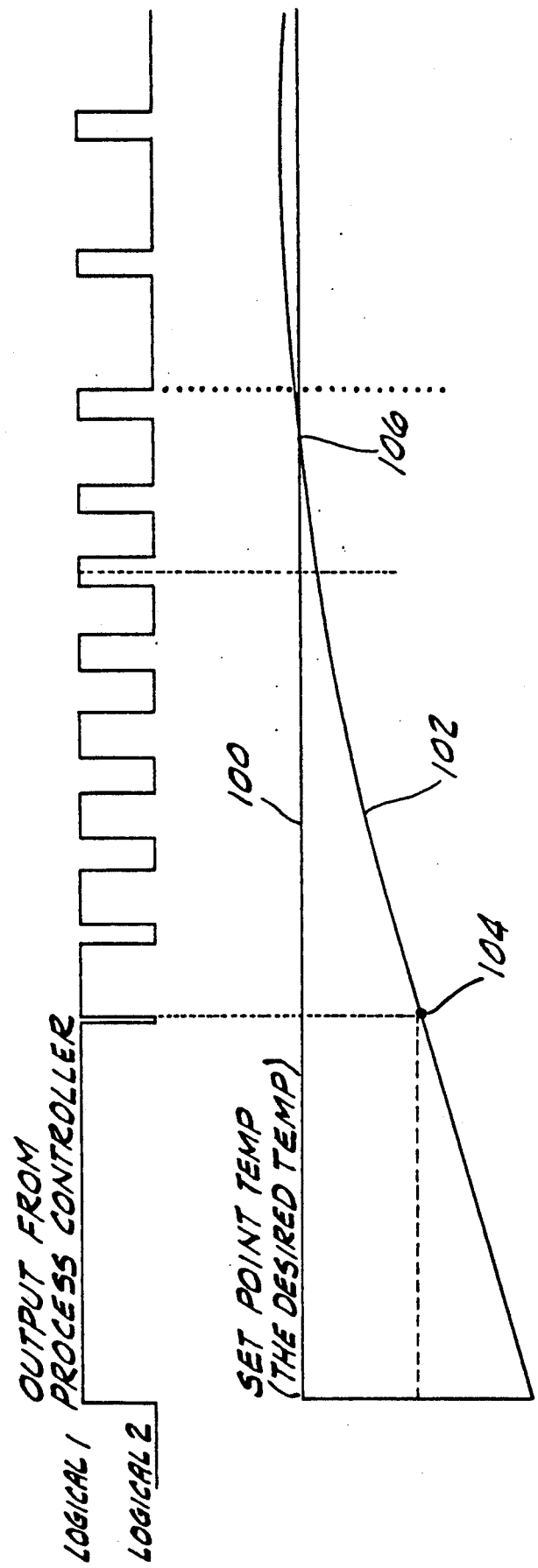
FIG. 3 is a timing diagram illustrating the output of a prior art process controller and illustrating the corresponding temperature response of a prior art process controller operating a heating device.

FIG. 3 illustrates a timing diagram of the output of a prior art process controller. A timing diagram of the corresponding temperature response of the substance being heated (which is the temperature sensed by the temperature probe) is also illustrated in FIG. 3 on the same time line as the output of the prior art process controller. Line 100 represents the selected set point temperature. Line 102 represents the temperature sensed by the probe. At the start of the heating process the difference between the sensed temperature and the set point temperature is large and this causes the output of the process controller to be on continuously. At a predetermined point 104 on line 102, such as when the sensed temperature is half that of the set point temperature, the output of the process controller begins to switch on and off to proportionally reduce the time the heating mantle is provided power. Point 106 represents when the sensed temperature equals the set point temperature. The sensed temperature after point 106 is shown overshooting the set point temperature. In some cases, particularly where the heater efficiency is many times greater than the amount of heat required, the amount of overshoot has been 50° C. to 100° C. In some applications an amount of overshoot can be tolerated. However, overshoots of this magnitude are unacceptable and can be catastrophic.

Figure 4:
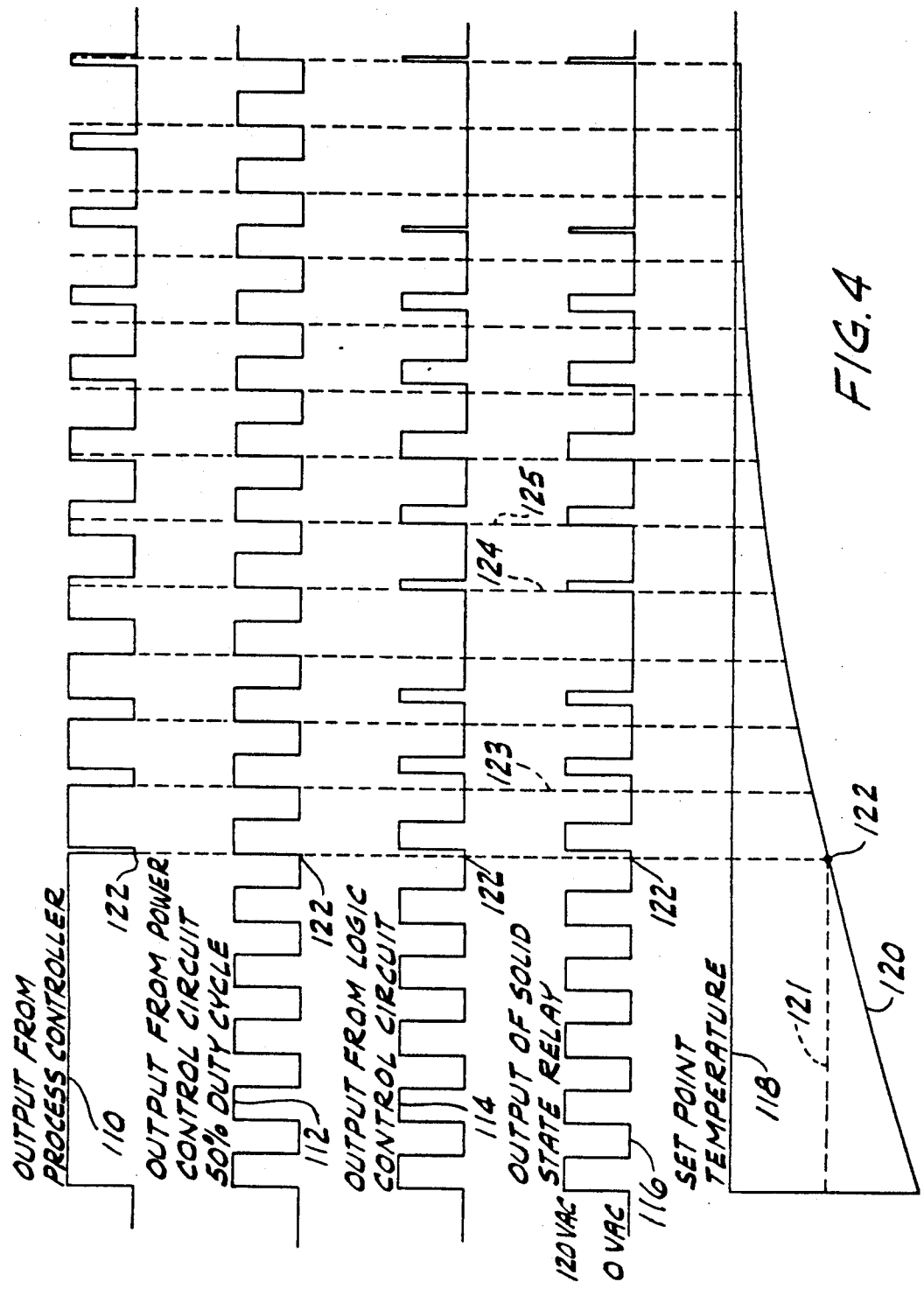
FIG. 4 is a timing diagram illustrating the output of the process controller, the power control circuit, the logic control circuit and the solid state relay of the power control apparatus of FIG. 1 and illustrating the corresponding temperature response of a system, according to the invention, for controlling the operation of a heating device.

In order to prevent unacceptable overshoot, the apparatus 20 shown in FIG. 1 is used. FIG. 4 illustrates timing diagrams, not to scale, of the various outputs of the apparatus 20. Waveform 110 represents the output of the process controller 30 over line 34, i.e. the first control signal. Waveform 112 represents the output of the power control circuit 50 over line 52, i.e. the second control signal. Waveform 114 represents the output of the logic control circuit 36 over line 54. Waveform 116 represents the output of the solid state relay 56 over line 62. Line 118 represents the selected set point temperature and line 120 represents the temperature sensed by the probe 28.

At the start of the heating process, the difference between the sensed temperature and the set point temperature is large and this causes the output of the process controller 30 to be on continuously. At a predetermined point 122 in time, such as when the sensed temperature is half that of the set point temperature as indicated by line 121, the process controller 30 begins to proportionally reduce the duty cycle of its output, as illustrated by waveform 110, in relation to the difference between the sensed and set point temperature by switching the first control signal on and off. The time the output of the process controller 30 is on and off is related to how close the sensed temperature is to the set point temperature. For example, as the sensed temperature approaches the set point temperature, the on time of the output of the process controller 30 decreases.

If the heating mantle 22 has 50% excess heating capacity at 120 VAC, for example, for the mass of the substance being heated, switch 42 is selected to reduce by 50% the power applied to the mantle 22. The waveform 112 of the output of the power control circuit 50 shows a 50% duty cycle. The duty cycle is on for 100 milliseconds and off for 100 milliseconds in this example. Other percentages of heater 22 capacity are selectable using switch 42. For example, a 25% duty cycle and a 10% duty cycle are selectable. The 50% duty cycle is combined with the output of the process controller 30 in the logic control circuit 36. The output of the logic control circuit 36 is illustrated by waveform 114 and is the result of the combination of the 50% duty cycle and the output of the process controller 30. Up until point 122 in time, the output of the logic control circuit 36 is the 50% duty cycle. Additionally, the output of the relay 56 is the 50% duty cycle up to point 122 in time.

The output of the process controller 30 after point 122 in time is combined with the 50% duty cycle of the power control circuit 50 in the logic control circuit 36 to further reduce the amount of power provided to the mantle 22. For example, during the period in time between dashed lines 124 and 125, the output of the logic control circuit 36 shown by waveform 114 is on for a shorter period of time than compared to the period between lines 122 and 123. The pulse frequency of the output of the process controller 30, as represented by waveform 110, is generally out of phase and independent of the pulse frequency of the output of the power control circuit 50, as represented by waveform 112. In general, a preferred pulse frequency of waveform 110 is from 10 Hz to 0.05 Hz whereas the pulse frequency of waveform 112 is about 3 Hz. Reducing the amount of power provided to the mantle 22 prevents or significantly reduces overshooting of the set point temperature. By controlling the duty cycle of the power control circuit 50 supplied to the logic control circuit 36, its output 54 that is supplied to the relay 56, can match the heater power to the mass being heated.

Figure 5:
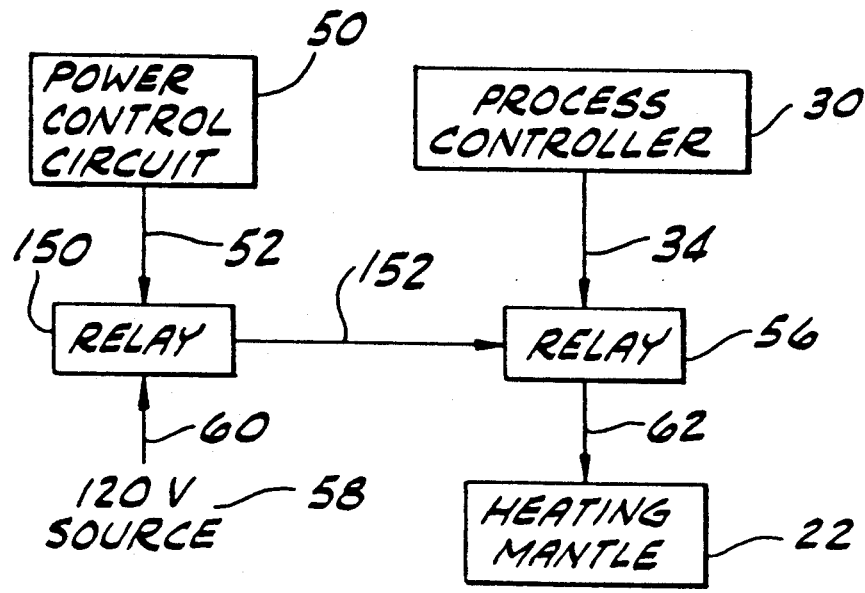
FIG. 5 is a block diagram of a second power control apparatus according to the invention.

FIG. 5 illustrates a second preferred embodiment of the power control apparatus according to the invention. In this embodiment the output of the process controller 30 is connected via line 34 directly to relay 56. The output of the power control circuit 50 is connected via line 52 to a relay such as second solid state relay 150 such as a triac, or a mechanical relay (not shown). The power supply 58 is connected via line 60 to the relay 150. The output of the relay 150 is connected via a line 152 to relay 56. Additionally, relay 56 is connected to the mantle 22 via line 62. The output of the relay 56 in this FIG. 5 embodiment is the same as the waveform 116 shown in FIG. 4.

In operation, the power control circuit 50 provides an output over line 52 to control relay 150. Relay 150 provides a 120 v signal on line 152 only during the period that the power control circuit 50 provides via line 52 a first control signal representing an "on" condition. Relay 56 provides the signal on line 152 to line 62 only during the period that the process controller 30 provides via line 34 a second control signal representing an "on" condition. For example, if the 50% duty cycle is selected, the output of the power control circuit 50 is the same as waveform 112 shown in FIG. 4. The relay 150 provides the 120 V signal to relay 56 during the period in which the 50% duty cycle is on. The process controller 30 provides an output over line 34 to control the operation of relay 56. The output of the process controller 30 is the same as the waveform 110 shown in FIG. 4. When the output of the process controller 30 is on and the 120 V signal is being supplied to relay 56, relay 56 will supply power to the heating mantle 22 over line 62.

Figure 6:
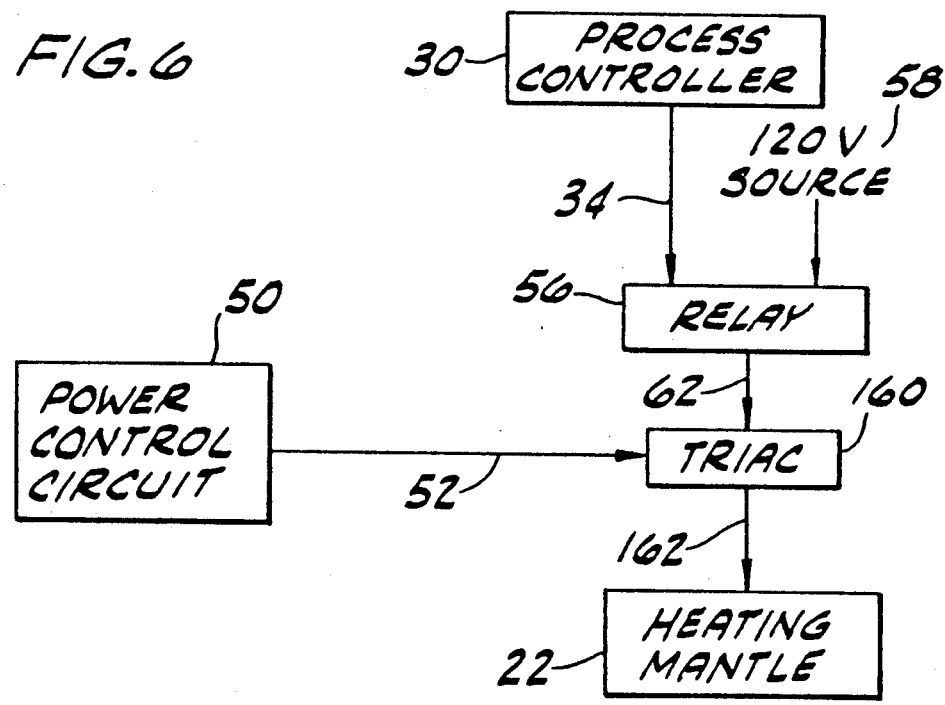
FIG. 6 is a block diagram of a third power control apparatus according to the invention.

A third preferred embodiment of the power control apparatus according to the invention is shown in FIG. 6. The output of the process controller 30 is connected via line 34 directly to relay 56. The power supply 58 is also connected to the relay 56 via line 60. The output of the relay 56 is connected to a SSR 160 via line 62. The output of the power control circuit 50 is connected via line 52 to the SSR 160. The output of the SSR 160 is connected to the mantle 22 via a line 162. The output of the SSR 160 is the same as the output of the relay 56 as represented by waveform 116 of FIG. 4.

In operation, the power control circuit 50 provides an output over line 52 to control SSR 160. Relay 56 provides a 120 v signal on line 62 only during the period that the process controller 30 provides via line 34 a second control signal representing an "on" condition. SSR 160 provides the signal on line 62 to line 162 only during the period that the power control circuit 50 provides via line 52 a first control signal representing an "on" condition. For example, if the 50% duty cycle is selected, the output of the power control circuit 50 is the same as waveform 112 shown in FIG. 4. The process controller 30 provides an output over line 34 to control relay 56. The output of the process controller 30 is the same as waveform 110 shown in FIG. 4. When the output of the process controller 30 is on the 120 V signal will be supplied from relay 56 to SSR 160 over line 62. When the 120 V signal is supplied to SSR 160 and the 50% duty cycle is supplied to SSR 160, the heating mantle 22 will be supplied power over line 162.

In summary, the invention comprises means for reducing the rate at which power is applied to the heating means. In general, heating mantles have a power rating which is at least a magnitude of five times greater than the desired amount for laboratory use. The means for reducing compensates for this excessive power rating.

Although the invention has been described as a digital device, it is contemplated the invention may be implemented as a mechanical or analog device.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for controlling means for heating a substance in accordance with a selected maximum power level which is to be applied to the means for heating and in accordance with a selected temperature to which the substance is to be heated, said apparatus for use in combination with means for sensing a temperature of the substance, said apparatus comprising:

first means for generating a first power level control signal which is a function of the difference between the selected temperature and the sensed temperature;

second means for generating a second power level control signal, independent of the first power level control signal and independent of the selected and sensed temperatures, which is a function of the selected maximum power level;

means for providing power for said means for heating; and means for selectively applying power provided by said means for providing to the means for heating at a power level as defined by both the first and second power level control signals whereby the amount of power applied to the means for heating is reduced as the substance approaches the selected temperature thereby avoiding overheating the substance to a temperature significantly above the selected temperature.

2. The apparatus of claim 1 wherein said means for selectively applying power comprises a relay between said means for providing power and said means for heating, and means for gating the relay in response to the first and second signals.

3. The apparatus of claim 1 wherein said means for selectively applying power comprises a first relay gated by said second control signal and a second relay gated by the first control signal, said first and second relays between said means for providing power and said means for heating.

4. The apparatus of claim 1 wherein said means for selectively applying power comprises a first relay gated by said first control signal and a second relay gated by the second control signal, said first and second relays between said means for providing power and said means for heating.

5. The apparatus of claim 2 wherein said means for sensing is a temperature sensor, said means for heating is a heating mantle, said first means for generating a first control signal is a process controller and said second means for generating a second control signal is a circuit for generating a series of pulses having a duty cycle which represents the selected maximum power.

6. The apparatus of claim 3 wherein said means for sensing is a temperature sensor, said means for heating is a heating mantle, said first means for generating a first control signal is a process controller and said second means for generating a second control signal is a circuit for generating a series of pulses having a duty cycle which represents the selected maximum power.

7. The apparatus of claim 4 wherein said means for sensing is a temperature sensor, said means for heating is a heating mantle, said first means for generating a first control signal is a process controller and said second means for generating a second control signal is a circuit for generating a series of pulses having a duty cycle which represents the selected maximum power.

8. The apparatus of claim 1 wherein the second means for generating a second power level control signal comprises means for selecting a percentage of the maximum power and means for supplying the percentage of the maximum power selected to the means for selectively applying power.

9. The apparatus of claim 1 wherein the second power level control signal is a constant signal which represents a power level less than the maximum power level and wherein the means for selectively applying is linearly responsive to the constant signal.

10. An apparatus for controlling heat applied to a substance comprising:
means for sensing a temperature of the substance;
means for heating the substance;
first means for selecting a temperature to which the substance is to be heated;
second means for selecting, independent of the selected temperature to which the substance is to be heated, a percentage of the maximum power to be applied to said means for heating;
means for supplying power to said means for heating;
means for controlling the rate at which power is to be applied by said means for heating to said substance in response to both the selected temperature and at a power level as defined by the selected percentage of the maximum power; and
means for comparing the sensed temperature of the substance and the selected temperature and reducing the duty cycle at which power is applied to said means for heating in the event that the sensed temperature is equal to or greater than the selected temperature.

11. The apparatus of claim 10 wherein said means for controlling comprises a relay between said means for supplying power and said means for heating, and means for gating the relay in response to the selected temperature and the selected percentage of the maximum power.

12. The apparatus of claim 10 wherein said means for controlling comprises a first relay gated by a signal representative of the selected percentage of the maximum power and a second relay gated by a signal representative of the selected temperature, said first and second relays between said means for supplying power and said means for heating.

13. The apparatus of claim 10 wherein said means for controlling comprises a first relay gated by a signal representative of the selected temperature and a second relay gated by a signal representative of the selected percentage of the maximum power, said first and second relays between said means for supplying power and said means for heating.

14. The apparatus of claims 11 wherein said means for sensing is a temperature sensor, said means for heating is a heating mantle, said first means for selecting and said means for comparing comprises a process controller, and said second means for selecting is a circuit for generating a series of pulses having a duty cycle which represents the selected percentage of the maximum power.

15. The apparatus of claims 12 wherein said means for sensing is a temperature sensor, said means for heating is a heating mantle, said first means for selecting and said means for comparing comprises a process controller, and said second means for selecting is a circuit for generating a series of pulses having a duty cycle which represents the selected percentage of the maximum power.

16. The apparatus of claims 13 wherein said means for sensing is a temperature sensor, said means for heating a heating mantle, said first means for selecting and said means for comparing comprises a process controller, and said second means for selecting is a circuit for generating a series of pulses having a duty cycle which represents the selected percentage of the maximum power.

17. An apparatus for heating a substance, the apparatus for use in combination with means for sensing a temperature of the substance being heated and means for heating the substance, the means for heating having a power rating greater than a desired power rating, said apparatus comprising:
a process controller adapted to control the means for heating in response to a first power level control signal which is a function of the difference between the selected temperature and the sensed temperature;
means responsive to said process controller for providing power for said means for heating; and
means for reducing the rate at which power is applied to the means for heating by said process controller independent of first power level control signal and independent of the selected and sensed temperatures.

18. The apparatus of claim 17 wherein said process controller generates a first control signal which is a function of the difference between the selected temperature and the sensed temperature; and further comprising:

means for generating a second power level control signal which is a function of the desired power rating and which is independent of the first power level control signal and independent of the selected and sensed temperatures; and means for selectively applying power provided by said means for providing to the means for heating at a power level as defined by both the first and second power level control signals whereby the amount of power applied to the means for heating is reduced as the substance approaches the selected temperature thereby avoiding overheating the substance to a temperature significantly above the selected temperature.

19. An apparatus for controlling means for heating a substance in accordance with a selected maximum power level which is to be applied to the means for heating and in accordance with a selected temperature to which the substance is to be heated, said apparatus for use in combination with means for sensing a temperature of the substance and first means for generating a first power level control signal which is a function of the difference between the selected temperature and the sensed temperature, said apparatus comprising:

second means for generating a second power level control signal, independent of the first power level control signal and independent of the selected and sensed temperatures, which is a function of the selected maximum power level;

means for providing power for said means for heating; and means for selectively applying power provided by said means for providing to the means for heating whereby the amount of power applied to the means for heating at a power level as defined by both the first and second power level control signals is reduced as the substance approaches the selected temperature thereby avoiding overheating the substance to a temperature significantly above the selected temperature.

20. A method of heating a substance comprising the steps of:

sensing the temperature of the substance;

heating the substance by a heating means;

selecting a temperature to which the substance is to be heated;

generating a first power level control signal which is a function of the difference between the selected temperature and the sensed temperature;

generating a second power level control signal, independent of the first power level control signal and independent of the selected and sensed temperatures, which is a function of the maximum power which is to be applied to the heating means;

providing power for the heating means; and selectively applying provided power to said heating means at a power level as defined by both the first and second power level control signals whereby the amount of power applied to the heating means is reduced as the substance approaches the selected temperature thereby avoiding overheating the substance to a temperature significantly above the selected temperature.

21. The method of claim 20 further comprising the steps of:

selecting the maximum power to be applied to said heating means;

supplying power for said heating means;

controlling the rate at which power is to be applied by said heating means to said substance in response to the selected temperature and the selected maximum power; and comparing the sensed temperature of the substance and the selected temperature and discontinuing the application of power to said heating means in the event that the sensed temperature is equal to or greater than the selected temperature.

* * * * *